United States Patent

Imamura

[11] Patent Number: 5,995,343
[45] Date of Patent: Nov. 30, 1999

[54] MAGNETIC HEAD WITH SPECIFIED TAPERED POLE TIP WIDTH RATIO

[75] Inventor: Junko Imamura, Kanagawa, Japan

[73] Assignee: Fujitsu Limited, Kawasaki, Japan

[21] Appl. No.: 08/925,195

[22] Filed: Sep. 8, 1997

[30] Foreign Application Priority Data

Feb. 14, 1997 [JP] Japan ..................................... 9-030806

[51] Int. Cl.$^6$ .............................. G11B 5/31; G11B 5/187; G11B 5/23
[52] U.S. Cl. ........................... 360/126; 360/122; 360/119
[58] Field of Search .................................... 360/126, 122, 360/119

[56] References Cited

U.S. PATENT DOCUMENTS

| | | | |
|---|---|---|---|
| 4,763,215 | 8/1988 | Gueugnon et al. ..................... | 360/122 |
| 4,921,508 | 5/1990 | Nonaka .................................. | 360/119 |
| 5,600,519 | 2/1997 | Heim et al. ............................ | 360/126 |

FOREIGN PATENT DOCUMENTS

| | | |
|---|---|---|
| 2-105308 | 4/1990 | Japan . |
| 3-296907 | 12/1991 | Japan . |
| 5-303719 | 11/1993 | Japan . |
| 6-150277 | 5/1994 | Japan . |
| 6-349026 | 12/1994 | Japan . |
| 8-050705 | 2/1996 | Japan . |

OTHER PUBLICATIONS

"Side Fringing of Thin Film Heads with Pole Trimming" J.Su et al.; IEEE Transactions of Magnetics, vol. 26, No. 5; Sep. 1990, p. 2463–2465.

*Primary Examiner*—Craig A. Renner
*Attorney, Agent, or Firm*—Greer, Burns & Crain Ltd.

[57] ABSTRACT

A magnetic head includes an elongate pole extending from an upper magnetic pole layer. The elongate pole has a tapered portion formed whose width is minimum width at the tip end of the pole. A ratio of the width of the narrowest section of the tapered portion to the width of the widest section (root) of the tapered portion is less than 1.0 but not less than 0.75.

12 Claims, 11 Drawing Sheets

FIG. 1A (Prior Art)
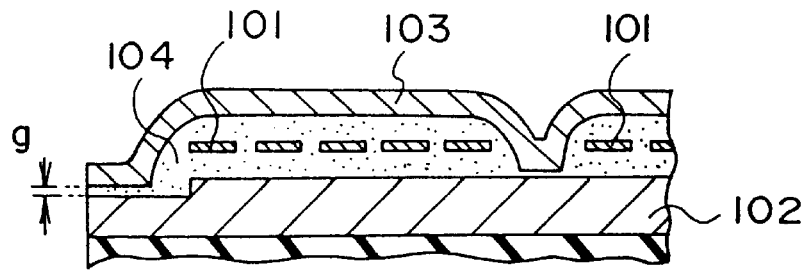
FIG. 1B (Prior Art)
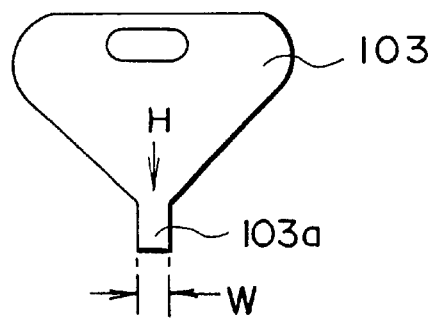
FIG. 1C (Prior Art)
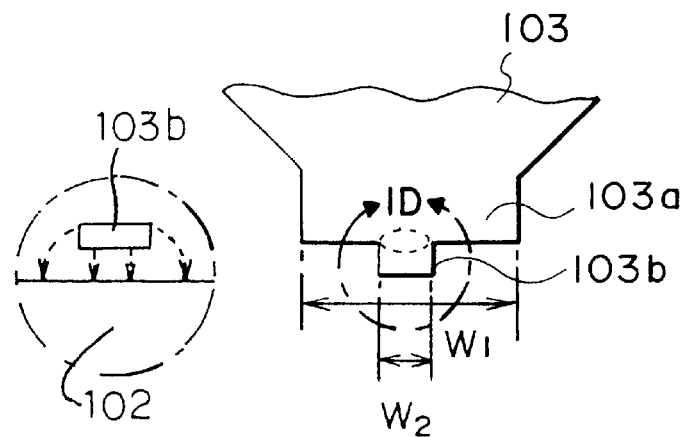
FIG. 1D (Prior Art)

- ◆ X 3 SAMPLES (PRIOR ART)
- ■ C 5 SAMPLES (THIS INVENTION OF FIG.8)
- △ F 5 SAMPLES (THIS INVENTION OF FIG.10)
- ——— LINEAR (X)
- ——— LINEAR (C)
- — — LINEAR (F)

MAGNETIC HEAD WITH SPECIFIED TAPERED POLE TIP WIDTH RATIO

FIELD OF THE INVENTION

The invention relates to a magnetic recording system and a magnetic head for use in conjunction with the magnetic recording system.

BACKGROUND OF THE INVENTION

Magnetic recording media such as magnetic disks have been extensively used, and efforts have been made to increase bit density on such magnetic media. Today, the bit density on a magnetic disk, for example, often exceeds 1 G bits/in$^2$. In order to further increase the bit density on a magnetic medium, it seems necessary to provide an improved magnetic write/read head. The most promising one is an induction type magnetic head.

A typical induction type magnetic head utilizes a coil wound on a block of magnetic core. In order to minimize the dimensions of the head, however, many of recent induction type magnetic heads incorporate a thin film.

As shown in FIG. 1, a magnetic head incorporating a thin film has a spiral induction coil 101, part of which is configured to pass through in between a lower core layer 102 and an upper core layer 103. Since the lower core layer 102 and the upper core layer 103 are made of conductive magnetic materials such as NiFe, the induction coil 101 is electrically insulated from the core layers 102 and 103 by an insulating layer 104. This type of induction type magnetic heads has a face that faces a magnetic disk such that the face has a write/read gap g between the lower core layer 102 and the upper core layer 103 for performing write and read operations, as shown in FIG. 1A.

The upper core layer 103 has on the face thereof a section which has an elongate pole 103a, as shown in FIG. 1B. The elongate pole 103 is configured such that the magnetic flux density H through it becomes greatest at the tip thereof.

A well known technique to form such elongate pole 103 is a photo-lithography in which the upper layer 103 is etched using a photo-resist mask.

In order to increase bit density in magnetic recording, it is necessary to make the width W of the elongate pole 103a small, as shown in FIGS. 1C and 1D, which may be attained by forming the tip of the elongate pole 103a in the form of thin rectangle having a narrow tip (called elongate pole-tip) 103b, as described in IEEE TRANSACTIONS ON MAGNETICS, Vol. 26, No. 5, September 1990 by James L. Su et al. According to this article, the maximum ratio of the width W2 of the elongate pole-tip 103b to the width W1 of the elongate pole 103a, W2/W1, is found to be 0.46, with W1 being 26 micrometers and W2 12 microns.

If a further increase in bit density is intended, the width W2 of the elongate pole-tip 103b must be further narrowed. However, it is difficult to form a elongate pole-tip having a width less than 2.5 microns in the photo-lithographic method, since the thickness of the upper core layer 103 is then of order of a few micron.

Furthermore, if the rectangular elongate pole-tip 103b is made about 2.5 micrometers wide, it is likely that the magnetic flux can saturate at the root section of the elongate pole 103b, and, should the magnetic flux saturate, change in magnetic field would not propagate beyond the saturated region, so that the tip of the elongate pole-tip 103b would become insensitive, thereby degrading over-write characteristic of the head.

Another related technology for providing a elongate pole configuration is described in U.S. Pat. No. 5,600,519. This patent discloses a thin film magnetic head having three sections defined by a flare point and a zero throat height. The width of the intermediate section between the flare point and the zero throat height progressively increases toward the flare point, as shown in FIGS. 12 and 13 of the aforementioned patent. This increase in the elongate pole dimension is to equalize the flux density in the elongate pole. However, this patent does not teach any influence of the head configuration on the over-write characteristic.

There is disclosed in Japanese Patent Publication Laid Open No. 2-105308 another form of the pole tip in which the elongate pole changes its width towards the pole tip at a given angle. This prior art also fails to teach any influence of the angle of the elongate pole on the over-write characteristic.

It is an object of the invention to provide a magnetic head which has an enhanced magnetic flux density in the pole tip, even when the width of the pole tip is 2.5 microns or less.

SUMMARY OF THE INVENTION

The above object of the invention may be attained by providing a magnetic head, comprising: a lower magnetic pole layer; an insulation layer formed on the lower magnetic pole layer; a conductive coil embedded in the insulation layer; an upper magnetic pole layer formed on the insulation layer; a elongate pole extending from the upper magnetic pole layer, the elongate pole having a taper portion at the tip, and near the tip, of the elongate pole, the taper portion having the smallest width at the tip thereof; and a non-magnetic gap layer formed between the taper portion and the lower magnetic pole layer, as shown in FIGS. 2, and 3.

The taper portion of the magnetic head may have two sides meeting with the tip end face at an angle between 45° and 90°.

It is preferable that the ratio of the width Wb of the tip end of The taper portion of to the width Wa of the root section of the taper portion, Wb/Wa, is less than 1, but not less than 0.75.

The width Wb of the taper portion is preferably not more than 2.5 microns.

Each of the sides of the taper portion preferably has a linear or a curved configuration.

It is preferable to have the taper portion formed on the underside of the elongate pole.

The object of the invention may be fulfilled also by a magnetic head, comprising: a lower magnetic pole layer; an insulation layer formed on the lower magnetic pole layer; a conductive coil embedded in the insulation layer; an upper magnetic pole layer formed on the insulation layer; a elongate pole extending from the upper magnetic pole layer; and a non-magnetic gap layer formed between the taper portion and the lower magnetic pole layer, as shown in FIGS. 2, and 3.

The object of the invention may be fulfilled also by a magnetic head, comprising: a lower magnetic pole layer; an insulation layer formed on the lower magnetic pole layer; a conductive coil embedded in the insulation layer; an upper magnetic pole layer formed on the insulation layer; a elongate pole extending from the upper magnetic pole layer; and a non-magnetic gap layer formed between the taper portion and the lower magnetic pole layer, wherein the lower magnetic pole layer is provided, on the side thereof facing the pole tip, with recesses, as shown in FIGS. 2, 3, and 8.

In this case, the tip of the elongate pole is smaller in width than the root section of the elongate pole.

The object of the invention is fulfilled by steps of: forming a first insulation layer on a lower magnetic pole layer; forming a conductive coil on the first insulation layer; forming a second insulation layer for covering the conductive coil; forming a magnetic layer on the second insulation layer; patterning the upper magnetic pole layer into a predetermined pattern by photo-lithographically etching the magnetic layer; and forming a tapered section having a width equal to or less than 2.5 microns by impinging an ion beam onto the tip of the elongate pole.

In this method, the sides of the taper portion may be linear or curved.

Also, the ion beam may be impinged onto the lower magnetic pole layer simultaneously so that a recess may be formed in the upper portion of the lower magnetic pole layer.

Further, the ion beam may be impinged on to the lower portion of the tip of the elongate pole, as shown in FIG. 10.

The magnetic head of the invention has several features.

First, the tip portion of the upper magnetic pole layer of the magnetic head is tapered, instead of having a stepped configuration, so that the magnetic flux at the root section of the elongate pole is less likely to saturate. As a result, the magnetic flux at the tapered tip may vary easily and, in addition, the magnetic flux density is enhanced.

It would be appreciated that with the tapered pole making an angle with the tip end face less than 90° but not less than 45°, over-write characteristic of the head is not degraded, as verified by experimental results shown in FIG. 4.

If the elongate pole is configured such that the ratio of the width at the tip to the width at the root section of the elongate pole is made less than 1 but not less than 0.75, the over-write characteristic is further enhanced, as verified by the experimental results shown in FIG. 5.

In another aspect of the invention, it is not difficult to make the width of the tip of the taper portion not to exceed 2.5 microns due to the fact that the elongate pole is tapered by means of ion beam bombardment, thereby minimizing the width of the track recorded on a magnetic recording medium.

It should be appreciated that a recess may be formed in the face of the lower magnetic pole layer facing the elongate pole, so that the magnetic flux coming out of the elongate pole of the upper magnetic elongate pole layer is less likely to diverge, that is, the write magnetic field between the elongate pole and the lower magnetic pole layer is better converged in the gap. As a result, leak of the flux from the gap is minimized and hence the induction magnetic head has a narrow write field.

BRIEF DESCRIPTION OF THE DRAWINGS

Preferred embodiments of the invention will now be described in conjunction with the accompanying drawings, in which:

FIG. 1A is a longitudinal cross section of a conventional magnetic head; FIG. 1B is a plan view showing an upper magnetic layer of the head; FIGS. 1C and 1D show in more detail a part of FIG. 1B.

DETAILED DESCRIPTION OF THE PREFERRED EMBODIMENT

We will now describe first a composite magnetic head which includes an induced type magnetic head on top of a magnetoresistance effect type magnetic head, and then discuss optimization of the upper magnetic pole layer of the induction type magnetic head.

Figure 2:
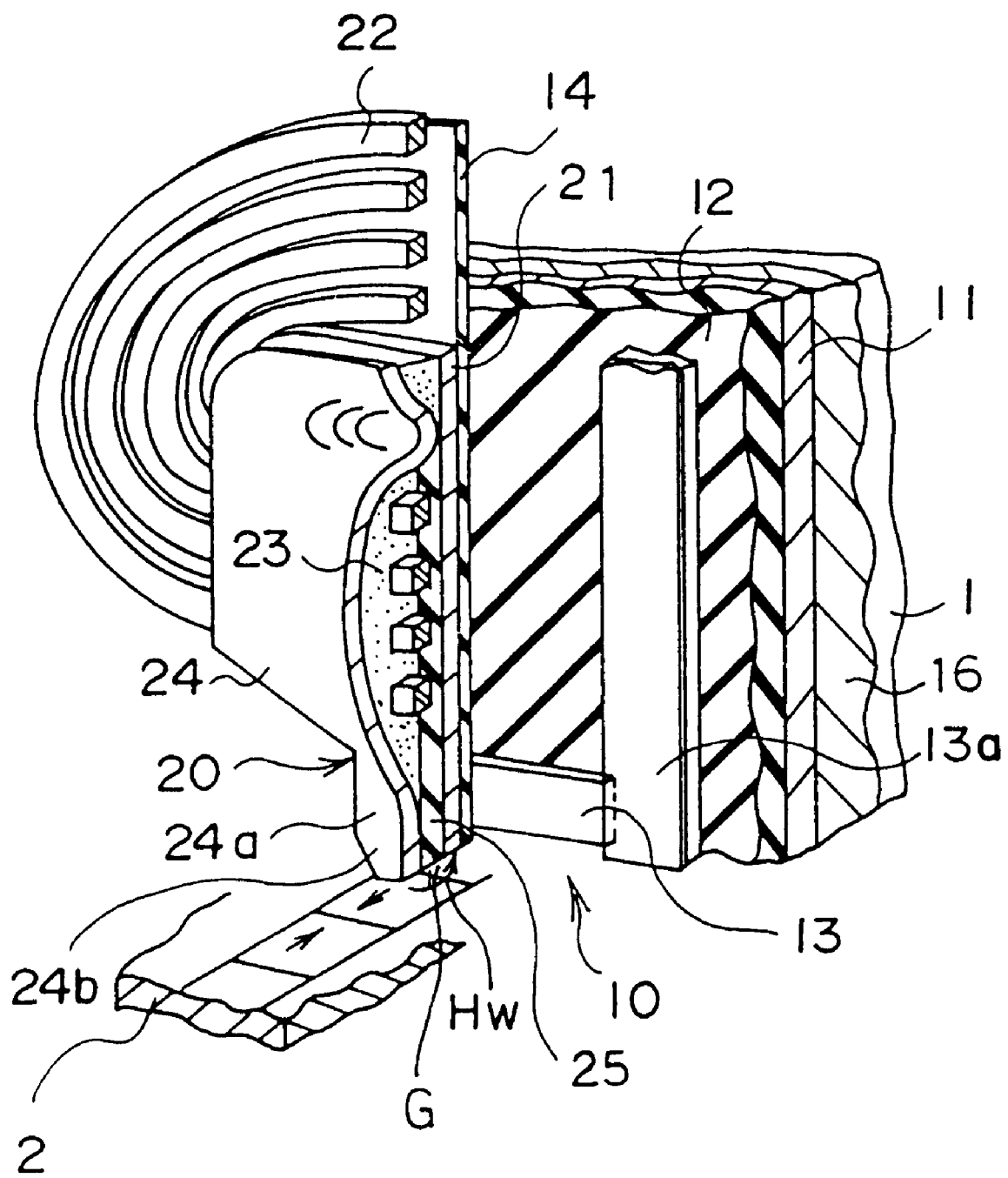
FIG. 2 is a perspective view of an induction type magnetic head embodying the invention.

FIG. 2 shows in perspective view a portion of a composite magnetic head incorporating an induction type magnetic head of the invention. FIG. 3 is a plan view of a main portion the induction type magnetic head. Formed on a head substrate 1 are magnetoresistance (MR) effect type magnetic head 10 for replaying (or reading) data along with an induction type head 20 which is capable of recording (or writing) as well as reading data.

The MR type magnetic head 10 consists of a first magnetic shield layer 11, a first non-magnetic insulation layer 12, a magnetoresistance effect element 13, and a second non-magnetic insulation layer 14. Connected on the opposite sides of the magnetoresistance effect element 13 are a pair of lead wires 13a. The magnetoresistance effect element 13 and the paired lead wires 13a are sandwiched between the first non-magnetic insulation layer 12 and the second non-magnetic insulation layer 14.

On the other hand, the induction type magnetic head 20 includes a lower magnetic pole layer (lower core) 21 made of NiFe, a spiral coil 22 for electromagnetic conversion of electric energy into magnetic flux, an upper magnetic pole layer (upper core) 24, formed on the MR type magnetic head 10 in the order mentioned.

The lower magnetic pole layer 21 is formed on the second non-magnetic insulation layer 14 of the MR type magnetic head 10 and in a region which extends from the tip of the magnetoresistance effect element 13 to the center of the spiral coil 22, and may serve as a second magnetic shield layer of the MR type magnetic head 10. It should be understood, however, that the lower magnetic pole layer 21 may be formed independently of the second magnetic shield layer of the MR type magnetic head 10.

Formed on the lower magnetic pole layer 21 is a gap layer 25 made of $Al_2O_3$ and having a thickness of about 0.2 microns.

Between the lower magnetic pole layer 21 and the upper magnetic pole layer 24 is an insulation layer 23, which includes therein a portion of the spiral coil 22 that extends out of the upper magnetic pole layer 24, thereby insulating the spiral coil 22 from the insulation layer 23 and the upper magnetic pole layer 24. The upper magnetic pole layer 24 has a recess in the region thereof above the center of the spiral coil 22. The recessed portion of the layer 24 penetrates the insulation layer 23 and touches the central portion of the lower magnetic pole layer 21. Thus, the layer 24 and the 23 are connected there, and no gap layer 25 exists in this region. In this region, the spiral coil 22 is spaced apart from the upper magnetic pole layer 24 and lower magnetic pole layer 21. As a result, the lower magnetic pole layer 21 and the insulation layer 23, when coupled together, form a C-shaped cross section.

It would be noted that the insulation layer 23 has a generally planar pentagonal shape as shown in FIG. 3(*a*), with an elongate pole 24*a* extending from one of the corner of the pentagon. The elongate pole 24*a*, having a length L of 5 microns and a width Wa of about 2.5 microns, is separated from the lower magnetic pole layer 21 by a gap layer 25. The space between the lower magnetic pole layer 21 and the elongate pole 24*a* serves as a read/write gap G, so that the dimension of the gap G equals the thickness of the gap layer 25.

When disposed inside the magnetic recording system, the tip of the elongate pole 24*a* and one end of the lower magnetic pole layer 21 are placed to face the disk surface of the magnetic recording medium (which is a magnetic disk in the example shown herein.).

Figure 3A:
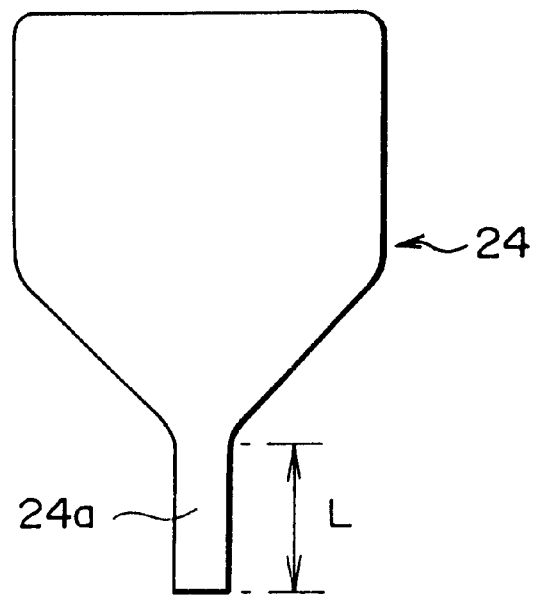
FIG. 3A is a plan view of the upper magnetic pole layer of the head shown in FIG. 2.
Figure 3B:
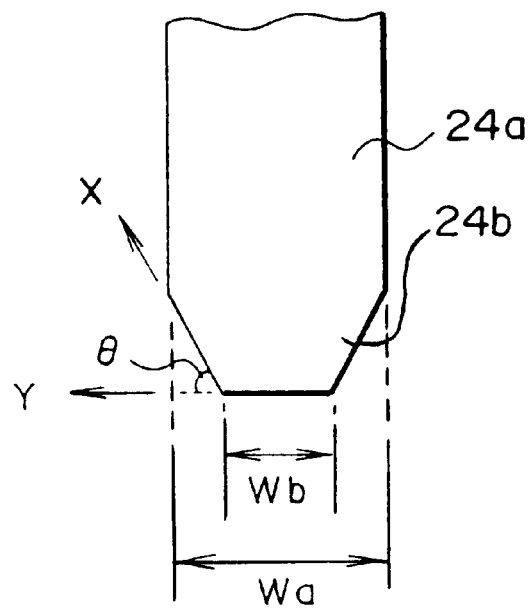
FIGS. 3B and 3C are plan views of the pole tip, and a section near the tip, of the upper magnetic pole layer.
Figure 3C:
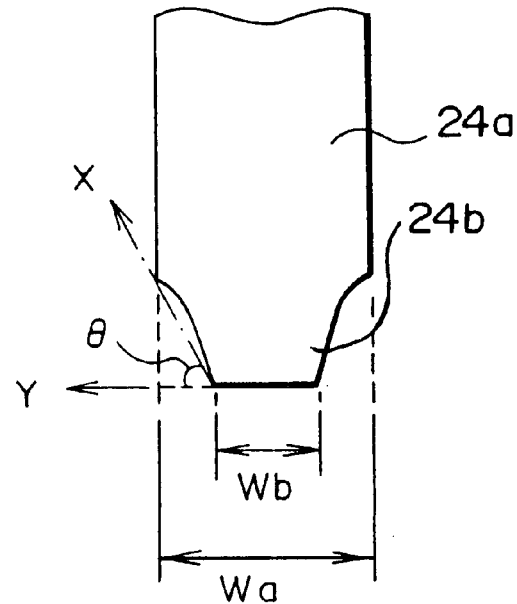

As shown in FIGS. 3B or 3C, the tip of the elongate pole 24*a* has a taper portion 24*b* which progressively decreases in width towards the tip of the pole 24*a*. The sides of the taper portion 24*b* may be linear as shown in FIG. 3B or curved as shown in FIG. 3C. The width Wa of the elongate pole 24*a* has a constant width of about 2.5 microns, except for the taper portion 24*b*. The width Wb of the tip end of the taper portion ranges between 1.87–2.5 microns, inclusive.

The elongate pole 24*a* is provided with the above mentioned taper portion 24*b* for the following reasons.

The magnetic field Hw generated by an electric current through the coil 22 passes through the lower magnetic pole layer 21 and the upper magnetic pole layer 24 to form a loop of magnetic field through the gap G, which is applied to a recording medium 2 (for example, magnetic disk) to store magnetically data carried by the electric current, as shown in FIG. 2. It should be noted that the magnetic flux density Hw through the lower magnetic pole layer 21 and the upper magnetic pole layer 24 is preferably maximum at the very tip of the elongate pole 24*a*.

If, however, a sharp pole tip 103*b* is formed at or the end of the elongate rectangular pole 103*a* as in prior art head shown in FIG. 1C, the magnetic flux can easily saturate at the root of the elongate pole 103*a*. This is due to the fact that the width of the pole tip quickly decreases in stepped condition. Consequently, rise in magnetic flux density is suppressed at the tip 103*b*, thereby making it difficult to yield an intense magnetic write field from the gap G.

In contrast, the upper magnetic pole layer 24 of the invention has a taper portion which gradually changes the width of the elongate pole. That is, the elongate pole 24*a* of the head is gradually tapered towards the tip of the upper magnetic pole layer 24 so that the magnetic flux does not saturate at the root (widest section) of the taper portion 24*a*, but instead the flux is allowed to converge towards the tip (narrowest section) of the elongate pole, thereby advantageously creating a high-density flux in the gap G for a write field.

Figure 4:
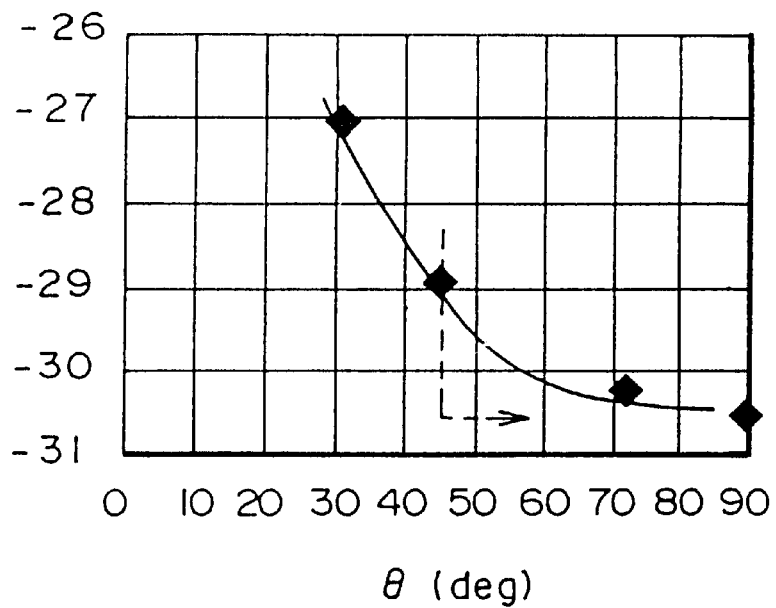
FIG. 4 shows a relationship between the over-write characteristic and the taper angle θ of the elongate pole of upper magnetic pole layer shown in FIGS. 3B and 3C.

Referring to FIG. 4, we now discuss how the taper portion 24*b* at and near the tip of the elongate pole 24*a* affects the over-write characteristic of the head.

Let the angle (hereinafter referred to as taper angle) that the line X connecting the initial and the final point of the tapered side 24*b* makes with the line Y passing through the tip end face be θ. Measurements done on the over-write characteristic for various taper angles reveal an apparent relationship between them, as shown in FIG. 4.

It is seen in this figure that the over-write characteristic gradually decreases in a region where taper angle is greater than 90°. On the other hand, the over-write characteristic undesirably drops far below 30 dB in the region of taper angle less than 30°. However, with the taper angle of 45°, the over-write characteristic drops below that of 90° by a small amount of about 1.5 dB.

Thus, it is advantageous to choose the taper angle greater than 45°. The taper angle of 90° must be excluded, since at that angle no taper portion 24*b* can exist on the elongate pole 24*a*. Accordingly, the taper angle θ must be chosen in the range given by the following inequality.

$$45° \leq \theta < 90° \qquad (1)$$

In order to maintain over-write magnetic flux equal to or greater than 30 dB, it is preferable to choose θ equal to or greater than 60°.

Figure 5:
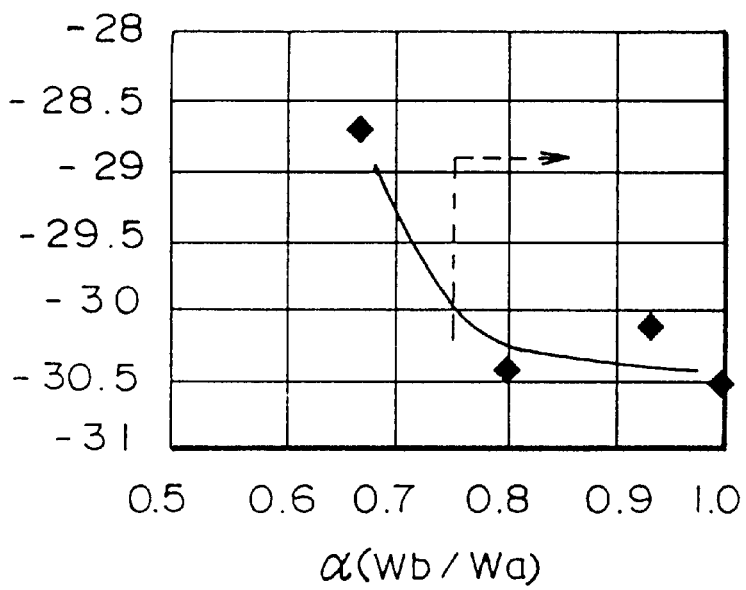
FIG. 5 shows a relationship between the over-write characteristic and the ratio of the width Wa of the elongate pole of the upper magnetic pole layer to the width Wb of the tip of the taper portion shown in FIGS. 3B and 3C.

FIG. 5 is a graphical representation of the experimental results showing how the ratio α (=Wb/Wa) affects the over-write characteristic, where Wa is the width of the elongate pole 24*a* and Wb is the tip width of the taper portion shown in FIGS. 2B and 2C.

FIG. 4 shows a relationship between the ratio a and the over-write characteristic. With the ratio in the range from 0.75 to 1.0, the over-write characteristic changes little, whereas the characteristic greatly drops for the α smaller than 0.75. Thus, it is preferable to choose the ratio of the widths to be greater than 0.75. The value α=1 corresponds to no taper portion 24*b* on the elongate pole 24*a*, so that preferable range of α is $$2 > Wb/Wa \geq 0.75 \qquad (2)$$

Figure 6:
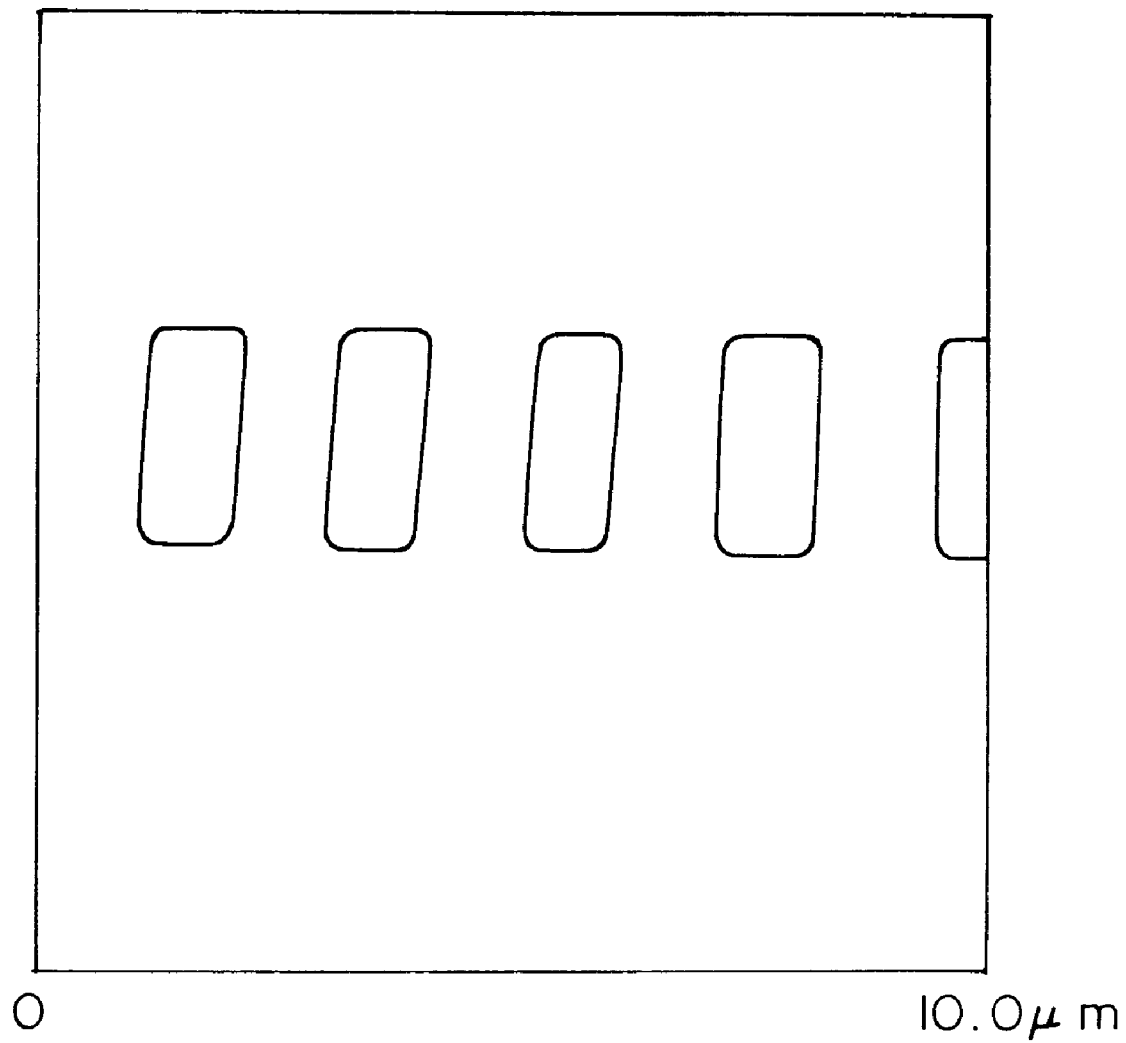
FIG. 6 is an MFM (magnetic field microscope) image of an inverted magnetic pattern obtained by an induction type magnetic head of the invention.

FIG. 6 illustrates a magnetic field microscope (MFM) image of a reversed magnetization pattern caused by a write field applied to the magnetic disk 2 for a magnetic head 20 of FIG. 2 for which an optical core width of the tip of the taper portion 24*b* of the upper magnetic pole layer was 2.0 microns. The effective core width was found to be 2.0 microns and write spread was zero, where the "effective core width" is defined as the width of a bit recorded on a magnetic recording medium (disk), and the "optical core width" as the width of the tip of the elongate pole having a write magnetic elongate pole as measured on the optical photography, and the "write spread width" as the width of the effective core width less the optical core width. It is noted that a layer 16 made of a material such as $Al_2O_3$ is formed between the substrate 1 and the magnetic shield layer 11, for protection of the substrate.

Figure 7A:
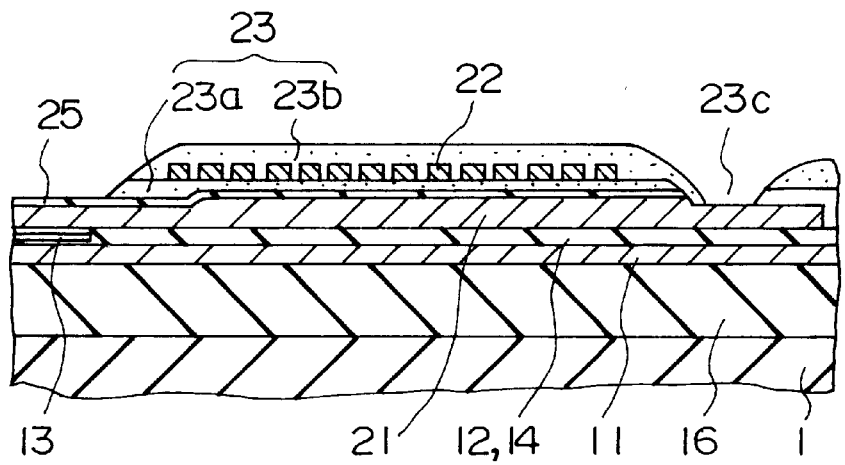
FIGS. 7A, 7B, and 7C are longitudinal cross sections of a magnetic head at various stages of manufacture.
Figure 7B:
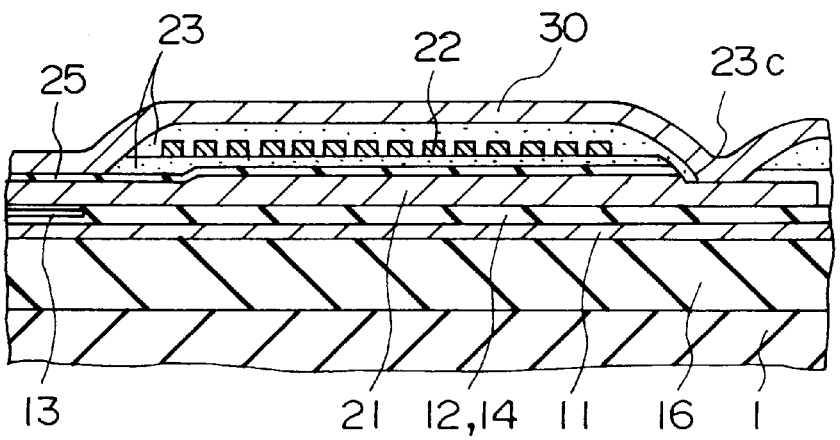
Figure 7C:
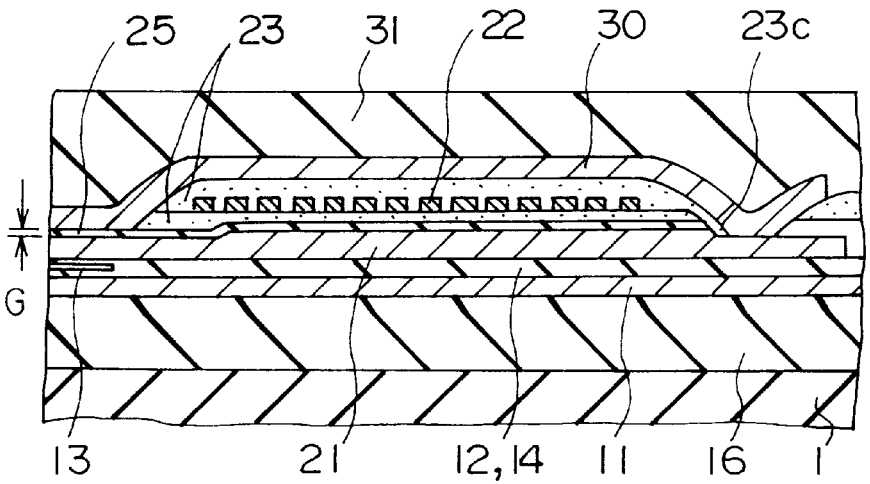
Figure 8A:
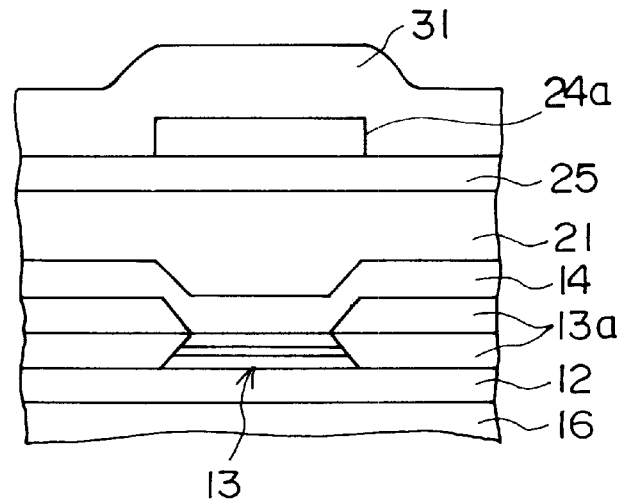
FIGS. 8A, 8B, and 8C together show trimming of the upper magnetic pole layer of the magnetic head according to the invention.
Figure 8B:
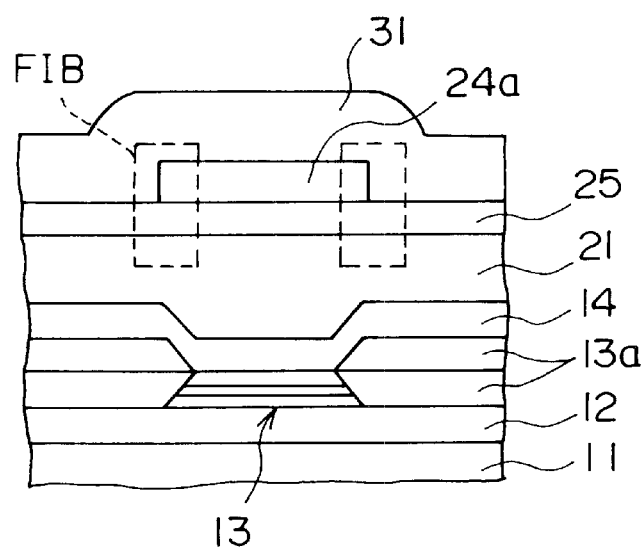
Figure 8C:
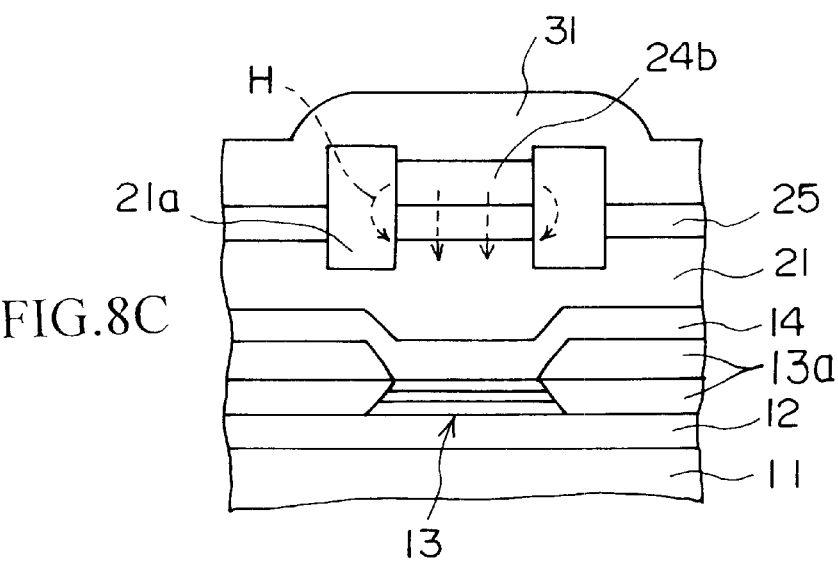

Referring to FIGS. 7A–7C, FIGS. 8A–8C, and FIGS. 9A and 9B, a process of forming the taper portion will be now described. FIGS. 7A–7C are partial cross sections of the materials at various stages of the head fabrication process. FIGS. 7A–7C shows a section from which an upper magnetic pole layer is fabricated. FIGS. 8A–8C shows the end face of the magnetic head facing a magnetic disk. FIG. 9 is a perspective view of a major portion of the induction type magnetic head.

A base protection layer 16, a first magnetic shield 11, a first non-magnetic insulation layer 12, a magnetoresistance effect element 13, a second non-magnetic insulation layer 14, and a lower magnetic pole layer 21 are formed on the head base 1, as shown in cross section in FIG. 7A. Then, a gap layer 25 is formed by depositing $Al_2O_3$ to a thickness of 0.5 microns, which is followed by formation of a first insulation layer 23a in a region where a spiral coil 22 will be formed.

A spiral coil 22 of copper is then formed on the first insulation layer 23a. A second insulation layer 23b is formed on top of the first insulation layer 23a, covering the spiral coil 22. The first and the second insulation layers 23a and 23b, respectively, constitute an insulation layer 23 shown in FIG. 2.

The spiral coil 22 is lithographically formed by patterning a copper layer. The first and the second insulation layers 23a and 23b, respectively, are formed from photo-sensitive organic layers such as photoresist made of polyimide resin or novolac family resin. The layers are patterned by first depositing the materials to a thickness of about 2 microns, which are then exposed to light and developed. The first and the second insulation layers 23a and 23b respectively, have openings 23c at the center of the spiral coil 22. The layers are partially removed above the magnetoresistance element 13. These layers are hardened by heat.

Next, as shown in FIG. 7B, the top of the resultant piece is covered with an NiFe layer having a thickness of 3.5 microns. This layer extends over the central openings 23c located essentially at the center of the spiral coil 22, and connects to the second magnetic shield layer (lower magnetic pole layer) 21 and covers the gap layer 24 above the magnetoresistance effect element 13.

The NiFe layer 30 may be patterned, using a photoresist mask and ion milling technique, into a generally pentagonal shape of an upper magnetic pole layer 24 as shown in FIG. 3A, with an elongate pole 24a extending from one of the five corners. The width of the elongate pole 24a, made by such lithographic patterning as described above, is at most 2.5 microns.

At this stage, there is no taper portion 24b formed in the tip section of the elongate pole 24a or near the tip thereof. The taper portion 24b is formed as follows.

Figure 9A:
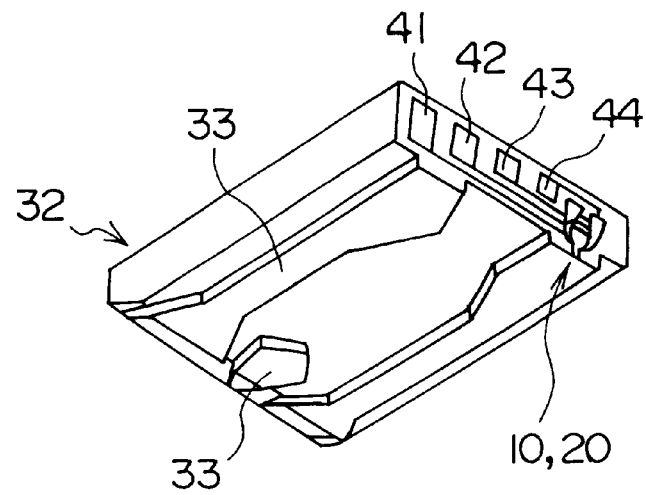
FIG. 9A is a perspective view of a slider mounted on the magnetic head of the invention.

A layer of $Al_2O_3$ is deposited on the induction type magnetic head 20, forming a protective layer 31, as shown in FIG. 7C and FIG. 8A. The base 1 is fabricated in a configuration suitable for a head slider 32, as shown in FIG. 9A. The head slider 32 is then provided, on the surface that will face the disk 2, with a protruding rail face (or air bearing face) 33. The slider 32 is further provided at the rear end thereof with the induction type magnetic head 20 and the MR type magnetic head 10, and at the ends thereof, with pads 41–44 to which both ends of the spiral coil 22 and a pair of terminals 13a of the MR element are connected.

A portion of the lower magnetic pole layer 21 of the induction type magnetic head 20 and the tip of the elongate pole 24a of the upper magnetic pole layer 24 are exposed at the end of the rail face 33.

Figure 9B:
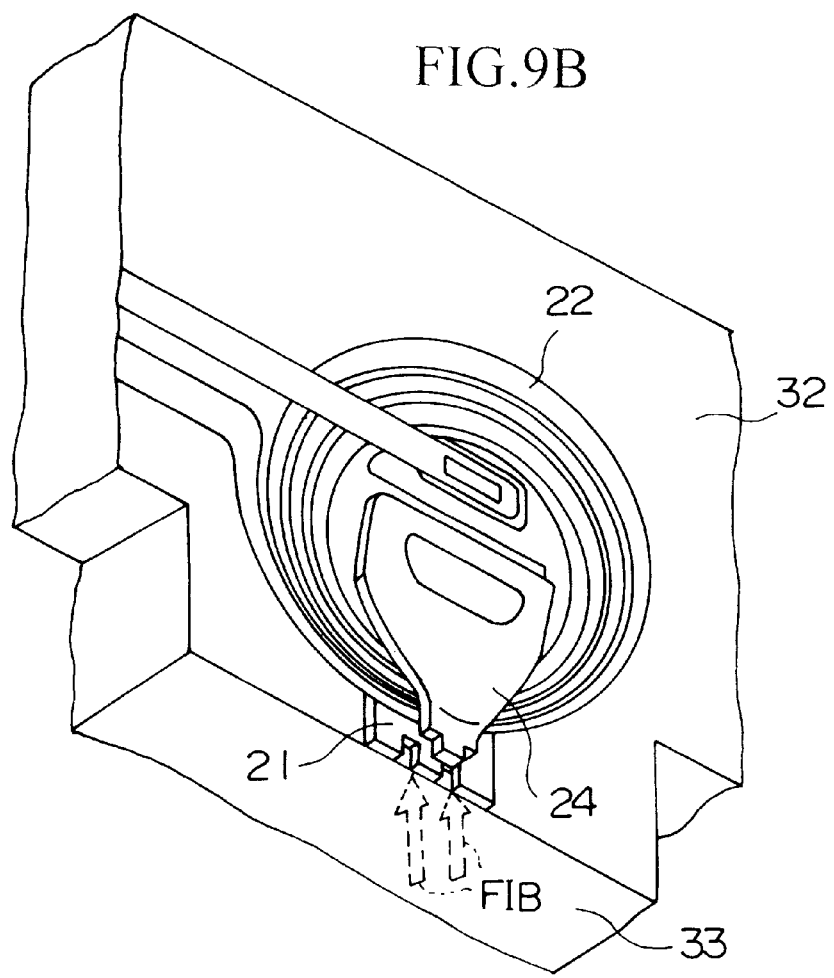
FIG. 9B is an enlarged portion of the FIG. 9A.

The opposite sides of the tip of the elongate pole 24a is then trimmed by bombarding a focused ion beam (FIB) while monitoring the tip using SEM, as shown in FIG. 8B and FIG. 9B, until the tip of the elongate pole 24a is trimmed to a thickness less than 2.5 microns. The trimmed tip has a shape as shown in detail in FIG. 2B and 2C.

Figure 10A:
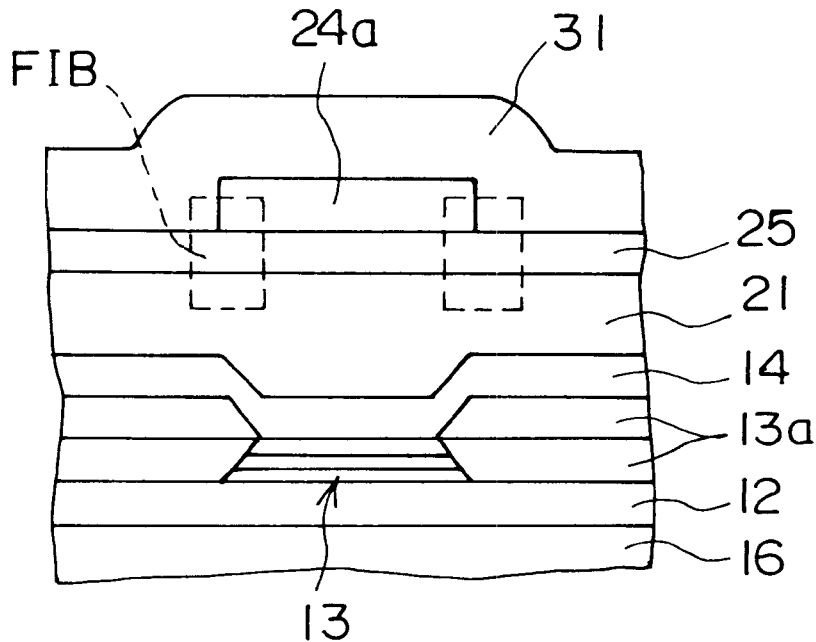
FIGS. 10A and 10B show a second type of trimming of the upper magnetic pole layer of the magnetic head of the invention.
Figure 10B:
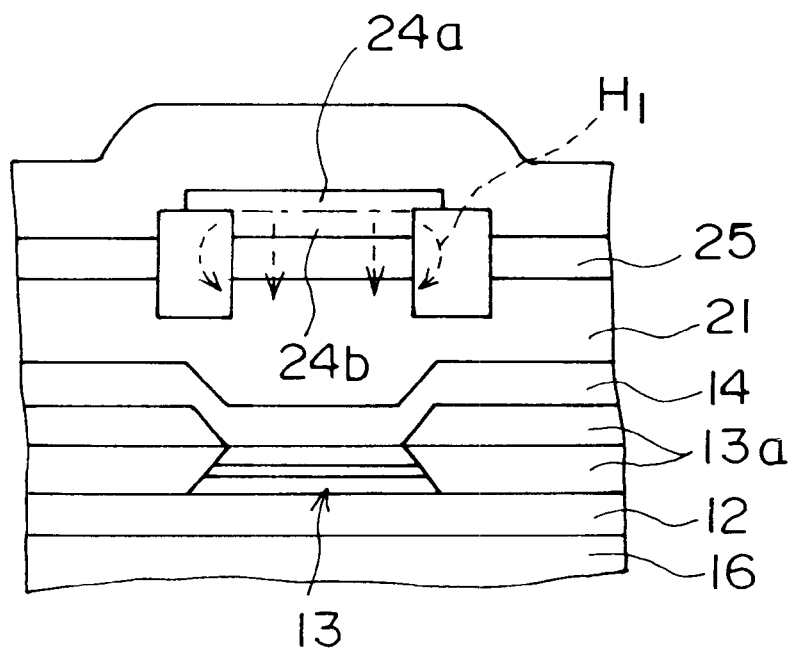

The tapered portion 24b may be formed along the entire length of the opposite sides of the elongate pole 24a, as shown in FIG. 8C, or may be formed only on the underside of the elongate pole 24a by trimming the tip as shown in FIGS. 10A and 10B. In either case, two sections of the lower magnetic pole layer 21 that face the taper portion 24b are trimmed to form the recesses 21a.

After finishing the trimming, a diamond like carbon layer (not shown) is sputtered on the head.

Figure 11:
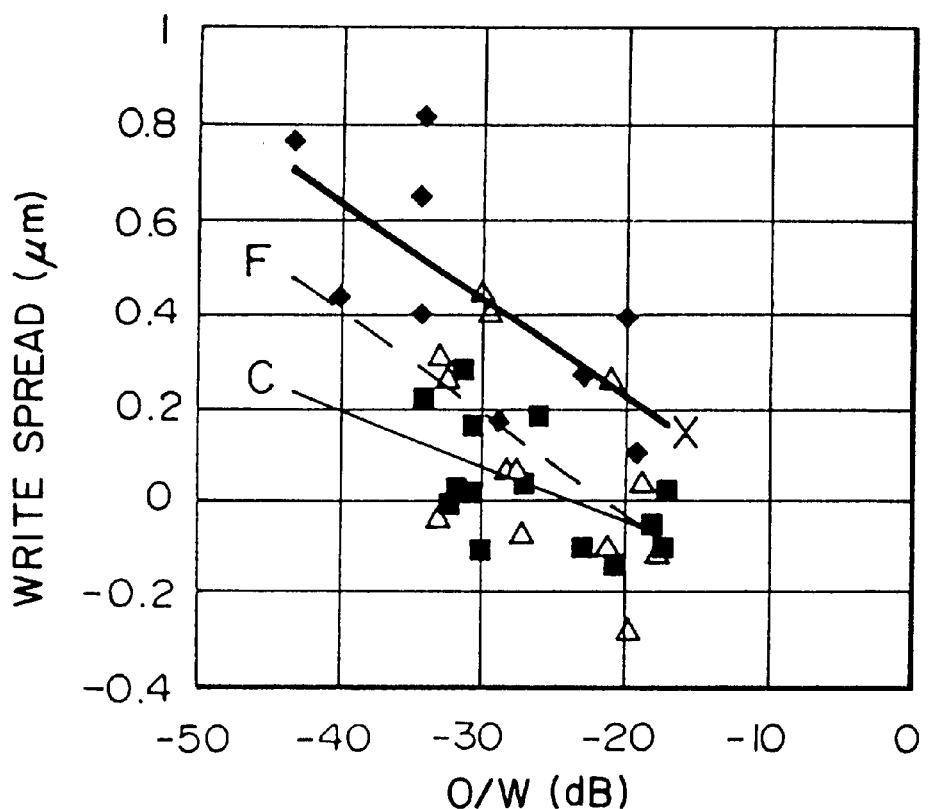
FIG. 11 is a graphical representation of the over-write characteristic (OVW) as a function of write spread for a conventional magnetic head and the magnetic head of the invention.
Figure 12:
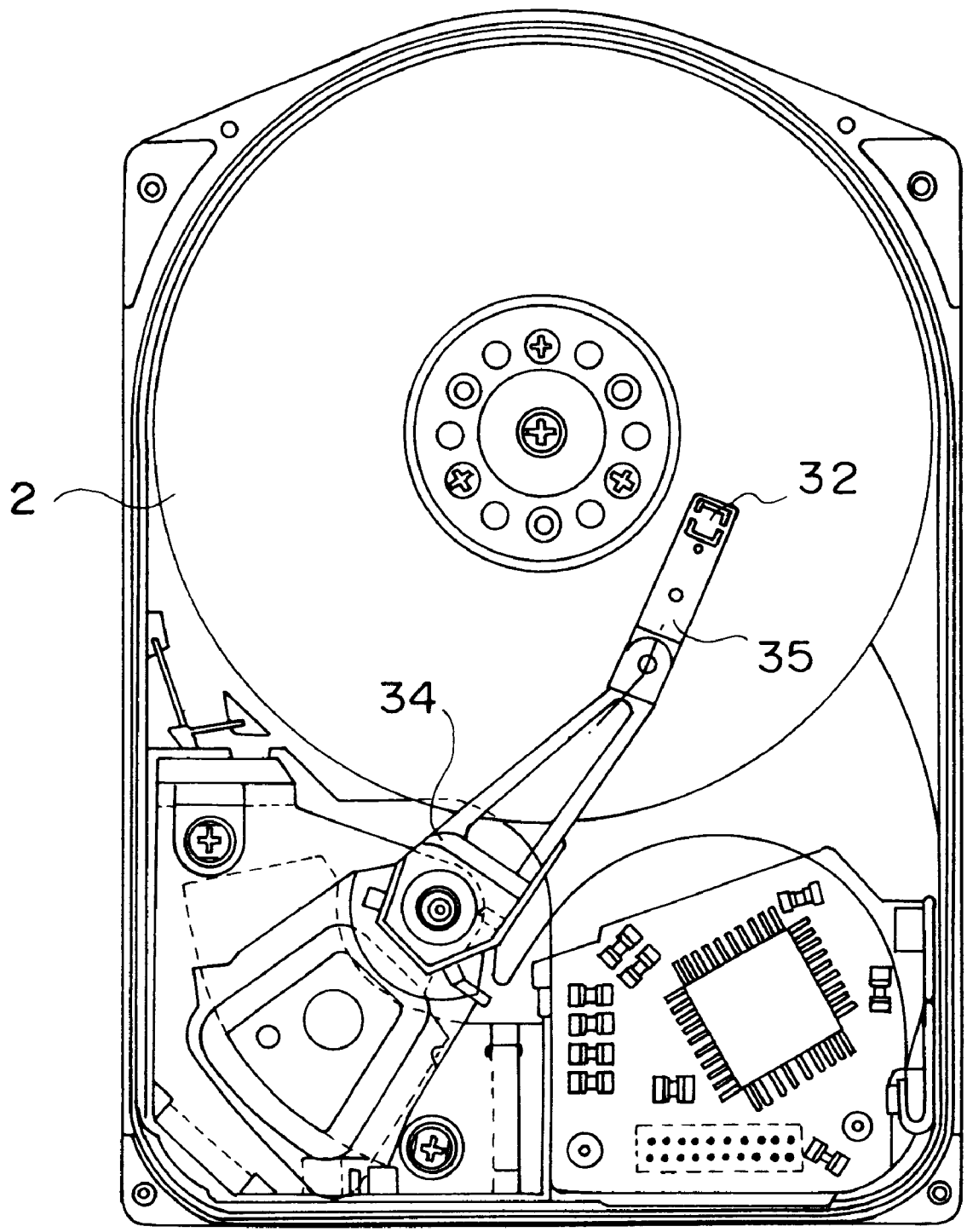
FIG. 12 is a plan view of a magnetic recording system which employs a magnetic head of the invention.

Experimental results on the write spread and over-write characteristic of a head thus formed are shown in FIG. 11. In this figure, a plot marked by diamonds represents the write spread for an untrimmed elongate pole; plots marked by squares and triangles represent write spreads for trimmed elongate poles, with square plots corresponding to elongate poles trimmed deeply compared with triangle plots. The width of the elongate pole 24a becomes smaller with trimming.

As seen in FIG. 11, the amount of the write spread cause by a trimmed pole 24a, or taper portion 24b, is smaller than that caused by an elongate pole which is not trimmed. In view of the fact that a magnetic field for use in over-write is less than 30 dB, tapered elongate pole 24a is better suited for high density recording on a magnetic recording medium than an elongate pole which is not trimmed, since a trimmed elongate pole exhibits less write spread than the latter by more than 30%. It should be appreciated that such a trimmed elongate pole 24a, with its tip trimmed by FIB to or less than 2.5 microns, not only has a small effective write core width but also has much less write spread. This may be understood from the following features of the invention.

When the elongate pole of the upper magnetic pole layer is trimmed by FIB to form the taper portion 24b, the upper portion of the lower magnetic pole layer 21 is also trimmed, forming the recesses 21a, as described previously and shown in FIG. 8C and FIG. 10B. As a result, the magnetic field H1 extending out of the lower end of the taper portion 24b tends to converge towards the lower magnetic pole layer 21 between the recesses 21a, instead of spreading around the tip. Accordingly, the write spread on the magnetic disk 2 is suppressed.

The slider 32 equipped with the induction type magnetic head 20 and the MR head 21 is mounted on the tip of an arm 35 of a disk recording system as shown in FIG. 11. The arm 35 is mounted on an actuator 34 which actuate the arm 35 to move the slider 32 over the disk 2.

Ones skilled in the art will appreciate that the induction type magnetic head 20 is not limited for use with magnetic disk systems, but it may equally be used for write and read on a magnetic tape system.

The magnetic head described above has the following advantages. First, since the elongate pole for the upper magnetic layer of the head is tapered at its tip, it is less likely that the magnetic field will saturate at the root section of the elongate pole, thereby permitting the magnetic flux density to change easily at the tapered tip while preventing the magnetic flux density from decreasing at the tip.

The tapered head having a taper angle with respect to the end face of the tip less than 90° but not less than 45°, may avoid loss of over-write characteristic. The loss of over-write characteristic may be also prevented by setting the ratio of the width of the taper portion to the width of the root section of the taper portion less than 1.0 but not less than 0.75.

In another aspect of the invention, the width of the tapered elongate pole may be made equal to or less than 2.5 microns by the use of ion beam trimming, thereby minimizing the width of tracks on a recording medium.

In a still another aspect of the invention, the lower magnetic pole layer is provided, on the side thereof facing the pole tip, with recesses, such that the divergence of the write field that would otherwise escape from the gap between the elongate pole and the lower magnetic pole layer, is prevented, so that the write spread is suppressed for the head.

What is claimed is:

1. A magnetic head, comprising:

a lower magnetic pole layer;

an insulation layer formed on said lower magnetic pole layer;

a conductive coil embedded in said insulation layer;

an upper magnetic pole layer formed on said insulation layer;

an elongate pole protruding from said upper magnetic pole layer, said elongate pole having a taper portion extending to a tip end face, said taper portion having a narrowest portion at said tip end face; and a non-magnetic gap layer formed between said taper portion and said lower magnetic pole layer, wherein said taper portion has opposite sides each making an angle of less than 90° but not less than 45° with a plane extending from said tip end face of said elongate pole;

wherein a ratio of the width of said narrowest portion of said taper portion to the width of a widest section (root) of said taper portion is less than 1.0 but not less than 0.75.

2. The magnetic head according to claim 1, wherein said taper portion is formed on an underside of said upper magnetic pole layer.

3. The magnetic head according to claim 1, wherein the width of said tip end face of said taper portion is not more than 2.5 microns and is not less than about 1.87 microns.

4. The magnetic head according to claim 1, wherein said opposite sides of said taper portion are linear.

5. The magnetic head according to claim 1, wherein said opposite sides of said taper portion are curved.

6. A magnetic head, comprising:

a lower magnetic pole layer;

an insulation layer formed on said lower magnetic pole layer;

a conductive coil embedded in said insulation layer;

an upper magnetic pole layer formed on said insulation layer;

an elongate pole extending from said upper magnetic pole layer, said elongate pole having a taper portion extending to a tip end face, said taper portion having a narrowest section at said tip end face; and a non-magnetic gap layer formed between said taper portion and said lower magnetic pole layer;

wherein the ratio of the width of said narrowest section of said taper portion to the width of a widest section (root) of said taper portion is less than 1.0 but not less than 0.75.

7. The magnetic head according to claim 6, wherein said taper portion has opposite sides making an angle of less than 90° but not less than 45° with a plane extending from said tip end face of said elongate pole.

8. The magnetic head according to claim 6, wherein said taper portion is formed on an underside of said upper magnetic pole layer.

9. The magnetic head according to claim 6, wherein the width of said tip end face of said taper portion is not more than 2.5 microns and is not less than about 1.87 microns.

10. The magnetic head according to claim 6, wherein opposite sides of said taper portion are linear.

11. The magnetic head according to claim 6, wherein opposite sides of said taper portion are curved.

12. A magnetic recording system, comprising:

a magnetic head according to any one of claims 1, 2, and 11;

a magnetic recording medium facing said magnetic head; and means for moving said magnetic medium relative to said magnetic head.

* * * * *